Oct. 25, 1955     C. J. SEIDEL     2,721,413
HOOK AND LINE PROTECTOR
Filed May 18, 1953
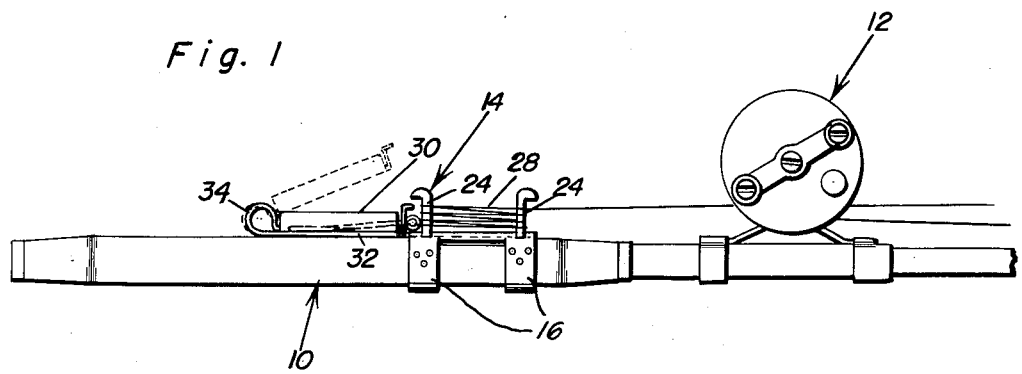
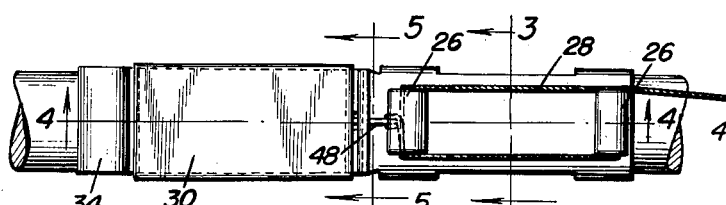
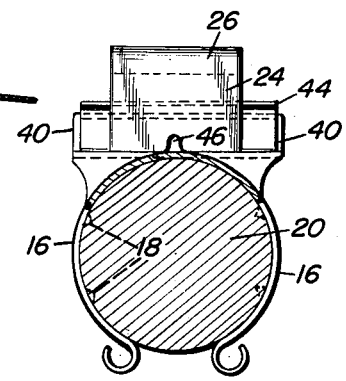
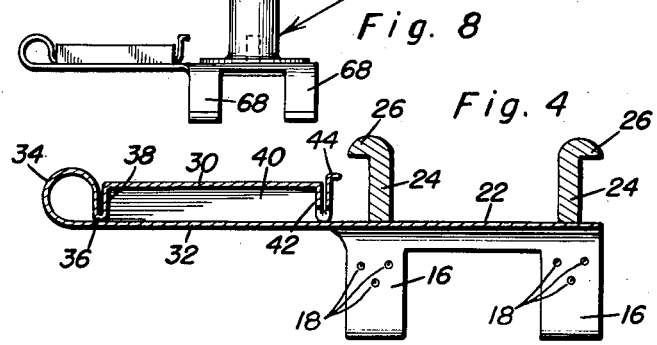
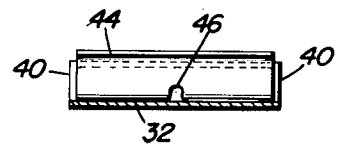
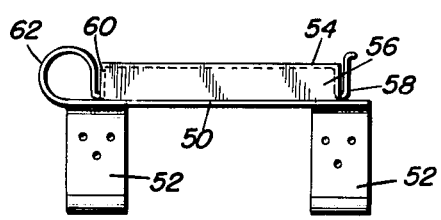
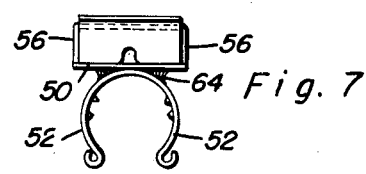
Carl J. Seidel
*INVENTOR.*
BY *Clarence A. O'Brien
and Harvey B. Jacobson*
                  *Attorneys*

United States Patent Office 2,721,413
Patented Oct. 25, 1955

2,721,413

HOOK AND LINE PROTECTOR

Carl J. Seidel, Rib Lake, Wis.

Application May 18, 1953, Serial No. 355,533

2 Claims. (Cl. 43—25.2)

This invention relates generally to fishermen's accessories and pertains more particularly to a device for drying fish line subsequent to its use.

A primary object of this invention is to provide an attachment for fishing poles which will permit the drying of fish line subsequent to its use and will also provide a convenient storage means for fishhooks.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the handle portion of a fishing rod showing the attachment in use;

Figure 2 is a plan view of a portion of the assembly shown in Figure 1 showing details of the attachment on an enlarged scale;

Figure 3 is a transverse section taken substantially along the plane of section line 3—3 of Figure 2 showing further details of the attachment on an enlarged scale;

Figure 4 is a longitudinal section taken substantially along the plane of section line 4—4 of Figure 2;

Figure 5 is another transverse section taken along the plane of section line 5—5 of Figure 2;

Figure 6 is a side elevational view of a modified form of attachment;

Figure 7 is an end view of the assembly shown in Figure 6; and

Figure 8 is a side elevational view of a further modification.

Referring now more particularly to Figure 1, reference numeral 10 indicates generally the handle of a fishing pole or rod in which the reel assembly 12 is secured in any well known manner and reference character 14 designates generally the accessory attachment forming this invention.

Referring now more particularly to Figure 4, it will be seen that the accessory includes an elongated plate-like sheet of material which is provided at one end thereof with depending oppositely disposed arcuate clamping legs 16 whose inner surfaces are provided with the projections 18 for firmly engaging the material 20 of the fish rod handle and the portion 22 of the plate carrying these clamping legs is provided at its upper surface with the inverted L-shaped post 24 having the horizontally extending end portion 26, wet fish lines being adapted to be wound thereon as indicated by the reference character 28 in Figure 1. The opposite end 30 of the plate member is disposed in overlying relation to the portion 32 and is connected thereto through the medium of the loop 34 whose outer end 36 is reversed upon itself to provide the vertical end flange 38 connected to the portion 30, as shown. The depending side flanges 40 and free end flange 42 which is reversely bent upon itself at its terminus and laterally deformed as at 44 to provide a handle member provide in conjunction with the portions 30 and 32 of the plate member an enclosure within which fishhooks may be disposed. In this respect, it will be noted that the end flange portion 42 of the member is provided with the notch 46 through which the attaching eye end 48 of a fishhook may be projected.

The plate member is preferably formed of resilient material so that the loop portion 34 thereof may be deformed when the handle member 44 is lifted to allow a fishhook to be inserted within the enclosure formed by the portion 32 and its associated depending flanges and the portion 32 of the plate, as indicated most clearly by the dotted lines in Figure 1.

Referring now more particularly to Figures 6 and 7, it will be seen that the portion 50 of the plate member carrying the depending clamp legs 52 is utilized as the bottom of the enclosure for fishhooks inasmuch as the top portion 54 is disposed in overlying relation thereto and in conjunction with its side flanges 56 and opposite end flanges 58 and 60, the latter of which is connected to the loop 62, forms an enclosure for associated fishhooks. In this instance, the clamping legs 52 are of substantially C-shaped construction and are secured as by welding 64 to the portion 50 of the plate member.

Referring now more particularly to Figure 8, the assembly shown is identical in construction to the assembly shown in Figures 1-5 with the exception that the post members 24 are supplanted by the reel assembly 66 journaled on the upper surface of the plate member above the clamping legs 68.

The operation and purpose of the above described attachment will be readily apparent to those skilled in the art inasmuch as it will be appreciated that the portions of the fishing line which have become wet will be disposed in wound relation on either the post assemblies 24 or the reel assembly 66 in the case of the forms shown in Figures 1 and 8 respectively and the fishhook will be disposed within the enclosure formed by the portions 30 and 32 of the plate member. In this manner, the fish line is effectively dried and prevented from rotting while at the same time a safe and convenient place is provided for the disposal of the fishhook until such time as it is further needed during subsequent fishing expeditions.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A fisherman's accessory comprising a plate having a main body portion and an end portion, said end portion being disposed in overlying relation to said main body portion and connected thereto by a loop, said end portion having a depending end flange forming a continuation of said loop, said end portion also having depending side flanges and an opposite end flange, all engaging said main body portion along their free edges and forming an enclosure for fishhooks, means on said plate for securing the same to a fish pole, and a pair of spaced, upstanding posts on said body portion adjacent said opposite end flange for supporting portions of a fish line in wound relation thereon.

2. A fisherman's accessory comprising a plate having a main body portion and an end portion, said end portion being disposed in overlying relation to said main body portion and connected thereto by a loop, said end portion having a depending end flange forming a continuation of said loop, said end portion also having depending side flanges and an opposite end flange, all engaging said main body portion along their free edges forming an enclosure for fishhooks, means on said plate for securing the same to a fish pole, and a pair of spaced, upstanding posts on said body portion adjacent said opposite end flange for supporting portions of a fish line in wound relation thereon, said opposite end flange being provided with a notch to permit passage of the shanks of fishhooks therethrough.

References Cited in the file of this patent

UNITED STATES PATENTS

| | | |
|---|---|---|
| 417,166 | Geisenheimer | Dec. 10, 1889 |
| 521,116 | Ingram | June 5, 1894 |
| 539,127 | Gump | May 14, 1895 |
| 1,178,967 | Taylor | Apr. 11, 1916 |
| 1,269,743 | Richmond | June 18, 1918 |
| 1,582,196 | Van Blarcom | Apr. 27, 1926 |
| 2,028,477 | Rupp | Jan. 21, 1936 |
| 2,179,578 | Monighan | Nov. 14, 1939 |